INVENTOR.
Owe Lindgren
BY
Strauch, Nolan, Neale, Nies & Bronaugh
ATTORNEYS

Aug. 12, 1969 O. LINDGREN 3,461,240

AMPLIFIER WITH TWO SEPARATE CHANNELS

Filed Nov. 7, 1966 4 Sheets-Sheet 2

INVENTOR.
Owe Lindgren
BY
Strauch, Nolan, Neale, Nies & Bronaugh
ATTORNEYS

Aug. 12, 1969 O. LINDGREN 3,461,240

AMPLIFIER WITH TWO SEPARATE CHANNELS

Filed Nov. 7, 1966 4 Sheets-Sheet 3

INVENTOR.
Owe Lindgren
BY
Strauch, Nolan, Neale, Nies & Bronaugh
ATTORNEYS

Aug. 12, 1969 O. LINDGREN 3,461,240

AMPLIFIER WITH TWO SEPARATE CHANNELS

Filed Nov. 7, 1966 4 Sheets-Sheet 4

INVENTOR.
Owe Lindgren
BY
Strauch, Nolan, Neale, Nies & Bronaugh
ATTORNEYS

United States Patent Office 3,461,240
Patented Aug. 12, 1969

3,461,240

AMPLIFIER WITH TWO SEPARATE CHANNELS

Owe Lindgren, Farsta, Sweden, assignor to Aktiebolaget Gylling & Co., Stockholm, Sweden, a corporation of Sweden Filed Nov. 7, 1966, Ser. No. 592,504
Claims priority, application Sweden, Dec. 16, 1965, 16,306/65
Int. Cl. H04m *1/02;* H04b *3/20*
U.S. Cl. 179—1 9 Claims

ABSTRACT OF THE DISCLOSURE

A dual amplifier with automatic control connected between two separate amplifying channels one of which is fed from a microphone and the other of which feeds to a loudspeaker, the coordinated system being connected to an input output signal carrier such as a telephone line. The amplifier control circuits are responsive to signal voltages applied to the loudspeaker channel for decreasing amplification in the microphone amplifier channel. The control provides that the microphone channel will never be totally blocked and if input signals are applied to the microphone channel the control enables amplification through the microphone channel to override amplification in the loudspeaker channel.

BACKGROUND OF THE INVENTION

The present invention relates to an amplifier with two separate channels which is included in a electrical-acoustical system of a type where the input of one of the channels (a microphone channel) is included in a system of a well defined signal level, for example a microphone, and the input of the other channel (a loudspeaker channel i.e., the channel between a line and a loudspeaker) is included in a system which has a less well defined signal level, for example is connected to a telephone line with varying signal levels, and in which the output of said loudspeaker channel is connected to a loudspeaker included in said electrical-acoustical system, and the output of the microphone channel, over a fork circuit, is connected to the telephone line, and in which there is acoustical-electrical crosstalk between said channels, primarily between said loudspeaker and said microphone, and a control device is provided which is adapted to control the amplification in both channels (voice switching) by means of control voltages which are generated from signal voltages taken out from outputs points in said channels.

Electric-acoustical systems of the kind indicated above are, for example, telephone systems in which one or more of the subscribers are provided with a loudspeaking telephone instrument.

Usually the amplifiers are constructed in such a way, that both channels in rest condition have a certain, suitably adjusted rest amplification. When a signal voltage occurs at the input of any of the channels, that channel will open still more, while the other channel will close in a corresponding degree. In amplifiers of that kind, it is necessary that the signal has a certain amplitude for the control process to get started. A telephone line represents a system, the signal level of which is not well defined, one does not know from one moment to the other if signal voltages of such an amplitude to start the control process will be obtained. Therefore, symmetrical amplifiers as previously known are not quite satisfactory for loudspeaking telephones.

It is also known to design the amplifier in such a way, that the loudspeaker channel is entirely open in rest condition, and the microphone channel totally blocked. Amplifiers of the last mentioned kind are sometimes constructed in that way, that a blocking voltage is generated, when the loudspeaker channel is passed by a signal voltage, which blocks the control system of the microphone channel, so that said channel is unable to open under the influence of signal voltages, which are generated by the microphone, when the microphone is exposed to sound energy originating from the loudspeaker. In known amplifiers of that kind, the microphone channel is, however, also unable to open under the influence of other sound waves. As long as a signal voltage passes the loudspeaker channel the direction of the speech will, therefore, be locked in one direction.

One object of the present invention is an amplifier which is so designed, that in spite of the fact that signal voltages, which are supplied to one of the channels (the loudspeaker channel), are not well defined (they are, for example, sometimes too weak to start the control process) there will be a sufficient amplification in said channel for the signals to be reproduced at a satisfactory audibility, by the loudspeaker which is connected to the output of said channel. Further, the amplifier is so designed, that when the loudspeaker channel is passed by signal voltages, the amplification in the microphone channel will be decreased. The microphone channel is very much choked but not totally blocked, and, therefore, it will be possible to change the direction of speech when signal voltages of a sufficient amplitude are supplied to the input of said channel.

The invention is substantially characterized by the fact that in the rest condition, i.e. when no signal is passing any of the channels, the microphone channel has rather low amplification (is substantially closed) and the loudspeaker channel has a rather high amplification (is substantially open) but not higher than when a signal is supplied from the line to the input of the channel, and the control voltage component generated by the signal voltage derived from the output point in the loudspeaker channel, exceeds a control voltage component generated by signal voltage derived from the output point of the microphone channel because of crosstalk between the loudspeaker and the microphone and a control voltage produced by cooperation between said control voltage components is brought to activate controlled amplifier stages or attenuator stages in the channels, the amplification in the microphone channel will be brought to a still lower value than it has in rest condition and the amplification in the loudspeaker channel will be brought to a still higher value than it has in rest condition.

In the following, the invention will now be described with reference to the drawings which by means of examples illustrate an embodiment of the invention.

Figure 1:
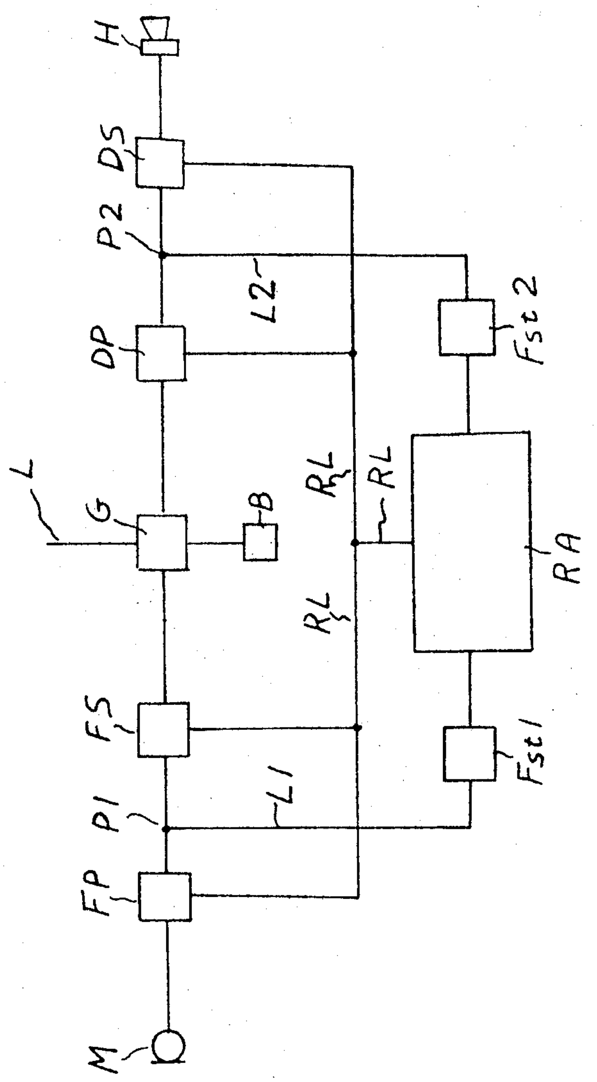
FIG. 1 is a block diagram for an amplifier according to the invention.

In FIG. 1, M is a microphone. F*p* designates an amplifier stage included in the microphone channel or the transmitting channel. F*s* is a second amplifier stage included in the microphone channel. F*st*1 designates an amplifier stage, the purpose of which is to amplify signal voltages which are derived from the microphone channel and which are supplied to the control voltage generator. D*p* designates an amplifier stage included in the loudspeaker channel or the receiving channel and D*s* designates a second amplifier stage included in said channel. F*st*2 designates an amplifier stage the purpose of which is to amplify signal voltages which are derived from the loudspeaker channel and which are supplied to the control voltage generator. H designates a loudspeaker connected to the loudspeaker channel. G is a fork circuit, and to this fork circuit an incoming double conductor line L and a balancing network B are connected.

The control voltage generator is designated RA.

The amplifier channel between the microphone M and the fork circuit G may, in addition to the controlled amplifier stages F*p* and F*s*, also contain other amplifier stages which are located before, between and/or after said controlled amplifier stages. Similarly, the amplifier channel between the fork circuit G and the loudspeaker H may, in addition to the controlled amplifier stages D*p* and D*s*, also contain other amplifier stages which may be located before, between and/or after said controlled amplifier stages.

Control voltages are supplied from the control voltage generator RA through a conductor RL to the controlled amplifier stages F*p* and F*s* and also to the controlled amplifier stages D*p* and D*s*.

The amplification in the amplifier stages F*p* and F*s* is so adjusted that when no signal voltage is passing any of aid channels, i.e. when the amplifier is in rest condition, the amplification in said amplifier stages is rather low, so that the transmitting channel from the microphone M to the fork circuit G is substantially closed. Between the amplifier stages F*p* and F*s*, there is an output point P1, to which a signal voltage conductor L1 is connected. Said signal voltage conductor supplies the amplifier stage F*st*1 with signal voltages which thereafter in amplified form are supplied to the control voltage generator RA.

In the rest condition the amplifier channel between the fork circuit G and the loudspeaker H is substantially open, which means that the amplification in the amplifier stages D*p* and D*s* is substantially at its maximum value. Between the amplifier stages D*p* and D*s*, there is a point P2, to which a conductor L2 is connected. Said conductor supplies the amplifier stage F*st*2 with signal voltages which thereafter in amplified form are supplied to the control voltage generator RA.

The amplifier stages F*p* and F*s* are designed in such a way that when a signal voltage is supplied thereto by the conductor RL the amplification in said amplifier stages is increased. The amplifier stages D*p* and D*s* are so designed, that when said amplifier stages are supplied by control voltage through the same conductor, the amplification in those amplifier stages is decreased.

Figure 2:
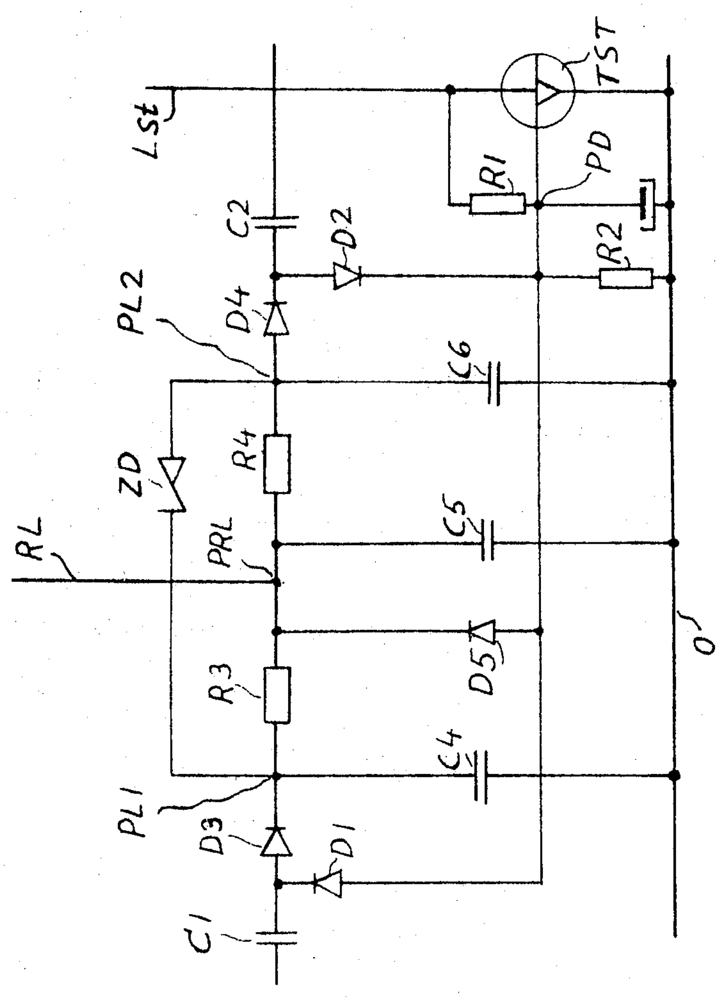
FIG. 2 is a diagram showing the control voltage generator and an adding circuit included in said generator.

The control voltage generator RA is illustrated more in detail in FIG. 2. It comprises four diodes D1, D2, D3 and D4, the positive pole of the diode D1, the negative pole of the diode D2 being connected to a common point PD. The point PD, by means of the voltage divider R1, R2, is kept at a substantially constant, stabilized voltage with respect to a conductor 0 which represents the voltage zero. Current is supplied to said voltage divider through conductor L*st*. In parallel to the voltage divider, a transistor TST is connected as a diode. The object of this transistor TST is to stabilize the voltage over the voltage divider. To the negative pole of the diode D1, the positive pole of the diode D3 is connected, and to the positive pole of the diode D2 the negative pole of the diode D4 is connected. Between the negative pole of the diode D3 and the positive pole of the diode D4, two resistors R3 and R4 are connected in series.

From the amplifier stage F*st*1 a signal voltage is supplied through a capacitor C1 to the diodes D1 and D3 and through another capacitor C2 a signal voltage is supplied from the amplifier stage F*st*2 to the diodes D2 and D4. The conductor RL, through which control voltages are taken out from this device, is connected to a point PRL which is located between the two resistors R3 and R4.

If the microphone M is exposed to sound waves, a part of the generated signal voltages will pass the amplifier stage F*p* and said voltages are conducted through the conductor L1 to the amplifier stage F*st*1 and from said amplifier stage through the capacitor C1 to the diodes D1 and D3. Thereby rectifying and doubling of the voltage will take place, by means of the diodes D1 and D3 and, due to this fact, the potential of the point PL1 will become more positive. Said change of potential causes a current to flow through the elements R3, R4, D4, D2 to the constant voltage point PD. Because of the voltage drop over the resistor R4 the potential of the point PRL will become more positive. At this occasion, a positive control voltage is, therefore, generated, which through the conductor RL, is supplied to the controlled amplifier stages F*p*, F*s*, D*p* and D*s*. The result of this control voltage is, that the amplification in the amplifier stages F*p* and F*s* is increased, and that the amplification in the amplifier stages D*p* and D*s* is decreased. The amplification in the transmitter channel between the microphone M and the fork circuit G will, therefore, increase to its maximum value, while the amplification in the receiving channel between the fork circuit G and the loudspeaker H will be considerably reduced, so that the last mentioned channel, which hitherto has been substantially open, now will be very much choked but not totally blocked.

If, on the other hand, signal voltages are passing from the conductor L through the fork circuit G and through the amplifier stages D*p* and D*s* to the loudspeaker H, a part of said signal voltages will be derived at the point P2 through the conductor L2 to the amplifier stage F*st*2. The amplified signal voltages are then supplied from the amplifier stage F*st*2 through the capacitor C2 to the diodes D2 and D4. Thereby, rectification and voltage doubling of the rectified signal voltage will take place by means of the diodes D2 and D4, and the potential of the point PL2 will become more negative. Said change of potential will give rise to a current from the constant voltage point PD through the diode D1, the diode D3, the resistor R3 and the resistor R4. The voltage drop over the resistor R3 will cause the voltage in the point PRL to become more negative. In this case it is, therefore, a negative control voltage which is supplied to the controlled amplifier stages F*p*, F*s*, D*p* and D*s* through the conductor RL. Due to this control voltage, the amplification in the amplifier stages F*p* and F*s* will be further decreased so that the channel between the microphone M and the fork circuit G, which hitherto has been considerably choked, now will be still further reduced. But even now it will not be totally blocked. On the amplifier stages D*p* and D*s* the control voltage influence is such that said amplifier stages will be totally open, so that the channel between the fork connection G and the loudspeaker H is totally open.

The device RA comprises three capacitors C4, C5 and C6 which are connected between the conductor 0 and different points of the chain of elements which comprises the elements D3, R3, R4 and D4. The object of the capacitor C4 is to smooth the rectified and the voltage-doubled signal voltage in the point PL1, said voltage being called U*st*1. The object of the capacitor C6 is to smooth the rectified and voltage-doubled signal voltage in the point PL2, said voltage being called U*st*2. The capacitor C5 gives a further smoothing of the voltage U*st* in the point PRL, said voltage being equal to U*st*1+U*st*2.

The capacitors C4, C5 and C6 also introduce a certain voltage time constant into the control process.

Said capacitors may, however, also cause a delay action, which is not desirable when rapid changes in the control process occur. Such rapid changes happen during the course of the conversation, when the exchange of words is quick and rapid remarks are made and also when one of the partaking persons wants to interrupt the other person in order to bring about a change of the speech direction. In order to reduce the effects of such an unwanted delay, caused by the capacitors C4, C5 and C6, it is important to limit the charging of said capacitors substantially to that voltage level, which is necessary for utilizing the whole control range in both amplifier channels. In order to bring about such a limitation of the charge of the capacitors C4, C5 and C6, there is a voltage limiter comprising a Zener diode ZD, connected between the cathode of the diode D3 and the anode of the diode D4. The voltage drop over the Zener diode ZD, as counted from the diode D3 to the diode D4, is substantially constant, for example 1.5 volts. Because of said Zener diode ZD, the voltage between the point PL1 and the point PD will never be more than 1.5 volts plus some tenths of a volt, which corresponds to the voltage drop in the diodes D4 and D2. Due to this fact, the voltage between the point PRL and the point PD will never rise to a higher value than to substantially half of said voltage value, that is 0.75 volt. This voltage, 0.75 volt, plus the voltage between the point PD and the zero conductor 0, is, however, sufficient to bring about a total opening of the amplifier stages F*p* and F*s* and to completely block the channel between the fork circuit G and the loudspeaker H by reducing the amplification in the amplifier stage D*p* and D*s*.

The Zener diode ZD has, however, also an additional, very favorable, effect. Said Zener diode acts as an amplitude limiter, which is active at the output of the amplifier stage F*st*1. In order to obtain a quick control process, it is to be preferred, that the amplifier stage F*st*1 has a great amplification. Therefore, the amplitude at the output of the amplifier stage F*st*1 rises to very high values, when the amplifier stage F*p*, under the influence of control voltage, is totally open. Therefore, the amplifier stage F*st*1 would have to be designed to deliver signal voltage of great power and the resistors R3 and R4 would have to be designed to endure heavy load. Due to the Zener diode ZD, the output voltage of the amplifier stage F*st*1 will be kept at a rather low value, indepent of how great voltage is supplied to the input side of this amplifier, and, therefore, said problems will be eliminated. The last mentioned effect of the Zener diode ZD will occur also if the signal voltage which is supplied to the control voltage generator RA is derived from the amplifier stage F*st*2.

It is, however, necessary that the signal voltages, which come from the amplifier stages F*st*1 and F*st*2, should be compared to each other also when the Zener diode ZD is conducting, and, therefore, said amplifier stages must deliver an increased current through the Zener diode when the signal voltage of their input terminals increases. Therefore, the potential in the point PRL will be determined independent of whether the amplifier F*st*1 or the amplifier F*st*2 has the highest input voltage at the input terminals of such amplifier.

The Zener diode ZD has, however, no limiting effect if the voltage of the point PRL becomes more negative and the capacitors C4, C5 and C6 are correspondingly charged to such values, which are necessary for obtaining the wanted control functions of the amplifier stages F*p*, F*s*, D*p* and D*s*. Therefore, a diode D5 is provided which is connected between the point PD and the point PRL, the conducting direction of said diode being from the point PD to the point PRL. When the potential of the point PRL becomes more negative, the diode D5 will be conducting, so that the potential change in said point will be limited to the threshold value of said diode. Said threshold value may be, for instance, 0.2 volt. The negative control voltage which can occur on the conductor RL will therefore be limited to 0.2 volt. It is supposed that said value is sufficient for obtaining the wanted control function.

Each of the amplifiers F*st*1 and F*st*2 comprises an amplifier stage consisting of a transistor and an output amplifier stage which comprises one NPN- and one PNP-transistor. The collector electrodes of said transistors are interconnected and form together the output of the amplifier stage. The signal voltage from the pre-amplifier stage is supplied to the base electrode of the NPN-transistor. The signal is supplied to the base electrode of the PNP-transistor through a condenser from an emitter resistor which is connected to the NPN-transistor. Because the output is connected to the interconnected collector electrodes, said amplifier stage has a high output impedance, which means that the amplifier stage delivers an output current which is substantially independent of the load.

Figure 3:
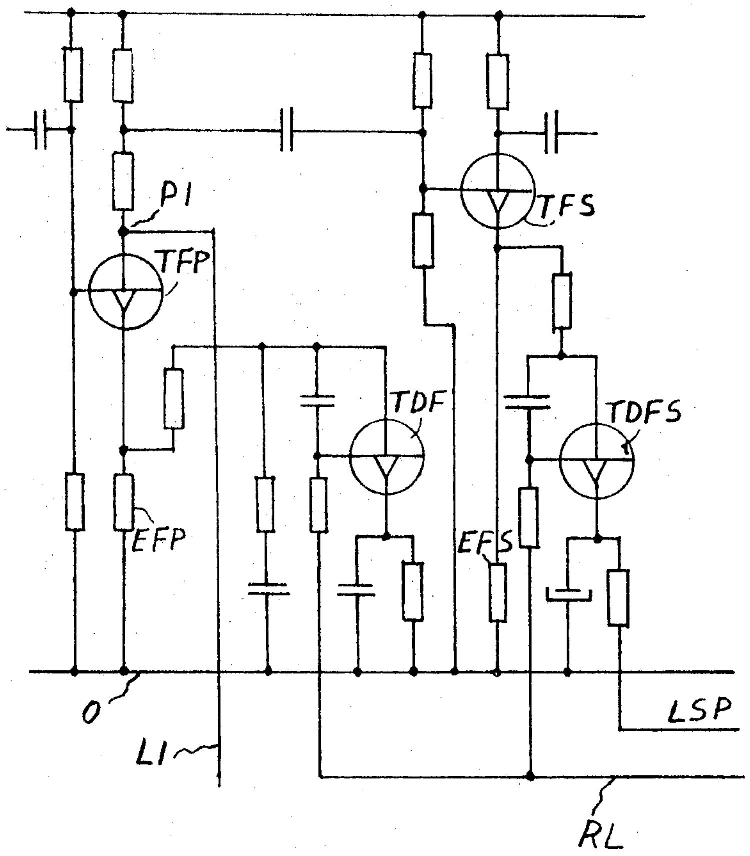
FIG. 3 shows diagrammatically the control amplifier stages included in the channel which is choked in rest condition.

In FIG. 3, is illustrated how the amplifier stages F*p* and F*s* and the output point P1 are arranged. The amplifier stage F*p* includes one transistor TFP, the emitter circuit of which contains an emitter impedance EFP. Said emitter impedance is connected in parallel to the transistor TDF, the base electrode of which is connected to the conductor RL through a resistor, and the collector electrode of which is connected to the emitter of the transistor TFP. The emitter of the transistor TDF is connected to the conductor 0 through a resistor and said resistor is connected in parallel with a capacitor. Between the collector and the base electrodes of the transistor TDF, there is a capacitor connected, the impedance of which is small for all frequencies within the frequency range for which the amplifier is designed. The transistor TDF is of NPN-type and is conducting when the base electrode is positive with respect to the emitter, i.e. with respect to the conductor 0. When the transistor TDF is conducting, the resulting emitter impedance of the transistor TFP is small, which means, that the amplification in the amplifier stage comprising the transistor TEP is high. The conductor L1, for taking out signal voltages to the amplifier F*st*1, is connected to the collector of the transistor TFP.

The collector impedance of the transistor TFP has the form of a voltage divider. Signal voltages are taken out from a point of this voltage divider and supplied to the base electrode of a transistor TFS which constitutes the amplifier stage F*s*. The emitter electrode of this transistor is provided with an emitter impedance in the form of a resistor EFS and a transistor TDFS which is connected in parallel to said resistor. The base electrode of the transistor TDFS is connected to the conductor RL through a resistor. The collector electrode of the transistor TDFS is connected to the emitter electrode of the transistor TFS through another resistor. Between the collector of the transistor TDFS and the base electrode of the same transistor a capacitor is connected, the impedance of which is small for all frequencies within the frequency range for which the amplifier is intended. The emitter electrode of the transistor TDFS is connected to the conductor 0 through a capacitor of great capacity value, and also to a conductor LSP through a resistor. The conductor LSP is connected to a voltage source which is somewhat positive, for example, 0.2 volt positive, with respect to the conductor O. Said voltage source can be a diode, which is so connected, that it is passed by a current, in the conduction direction of said diode, to the conductor 0. The diode may, for example, be connected in series with any of the other transistors of the amplifier, and in that case the diode does not form an additional load to the voltage supply source which feeds the whole device.

The transistor TDFS has the same influence on the amplification in the amplifier stage TFS as the transistor TDF on the amplification in the amplifier stage TFP. When the potential of the conductor RL is becoming more positive, the transistor TDFS will be conducting and the amplification in the amplifier stage TFS will increase. When, on the contrary, the conductor RL has a negative voltage with respect to the point PD, the transistor TDFS will be non-conducting, and in this case the amplification in the amplifier stage TFS is low. Because the emitter electrode of the transistor TDFS is somewhat biased in a positive direction the transistor TDFS will, however, be conducting only for a higher (more positive) potential on the conductor RL than the transistor TDF, which is somewhat conducting already in rest condition. This means that the amplification in the amplifier stage TFS during the starting of the control process will be activated later than the amplifier stage TFP.

Figure 4:
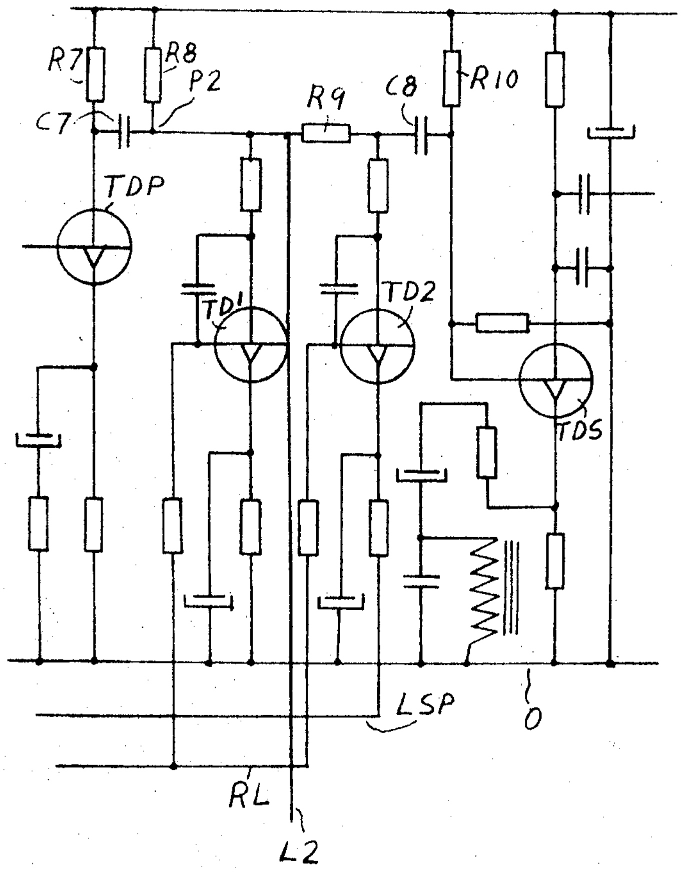
FIG. 4 shows diagrammatically the amplifier stages included in the channel which is open in rest condition.

In FIG. 4 there is illustrated how the amplifier stages D*p* and D*s* and the output point P2 for signal voltage may be arranged. From an amplifier stage, which comprises a transistor TDP, the signal voltage will be conducted through a capacitor C7, through a resistor R9 and through another capacitor C8 to the base electrode in another amplifier stage, which includes a transistor TDS. The resistor R9 forms the series impedance in a $\pi$-filter, the two parallel impedances of which, each includes a transistor TD1 and TD2, respectively. The collector electrode of the transistor TD1 is, through a resistor, connected to the input end of the resistor R9. The emitter electrode of said transistor is through a resistor and a capacitor, connected in parallel to said resistor, connected to the conductor 0. In a corresponding way the transistor TD2 has its collector electrode connected to the output end of the resistor R9 through a resistor. The emitter electrode of said transistor is connected to the conductor 0 through a capacitor. The emitter electrode is further through a resistor connected to the conductor LSP which, as described before, has a low positive bias. The base electrodes of both transistors TD1 and TD2 are connected to the conductor RL through suitable resistors. Said base electrodes are further connected to the collector electrodes of the transistors by capacitors, the impedances of which are small for all frequencies within the frequency range for which the amplifier is designed.

In rest condition, when the potential of the conductor RL is equal to the potential of the point P2 the transistors TD1 and TD2 are conducting only to a small degree and, therefore, the amplification in the amplifier stages D*p* and D*s* is nearly maximum, but not entirely at its maximum. When the potential of the conductor RL becomes more positive, the transistors TD1 and TD2 will be conducting, which means that the amplification in the amplifier stages D*p* and D*s* will decrease. The conductor L2, which supplies the amplifier F*st*2 with signal voltages, is connected after the capacitor C7 and before the resistor R9, in the point P2 as illustrated. Because the emitter electrode of the transistor TD2 is somewhat more positive than the emitter electrode of the transistor TD1, the transistor TD2 will be attenuating for a somewhat higher positive potential on the conductor RL than the transistor TD1.

The transistors TD1 and TD2 are supplied with current through a special resistor R8 which by means of capacitors C7 and C8 is galvanically insulated from the collector resistor R7 of the transistor TDP and the base resistor R10 of the transistor TDS. The object of this arrangement is that the current which flows through the transistors TD1 and TD2 should not change the operating point of any of the signal amplifying transistors, which otherwise would give cause to distortion.

The amplifier described above is intended to be adjusted in that way, that the receiving channel between the fork circuit G and the loudspeaker H in rest condition is adjusted for nearly maximum amplification, and that the transmitting channel between the microphone M and the fork circuit G has a rather low amplification. Said adjustment is carried out by adjusting the voltage of the point PD. The voltage of the point PD can, of course be altered by choosing the values of the resistors R1 and R2 in relation to each other. By such steps it is possible to obtain all adjustments of the rest conditions from such a condition, in which the transmitting channel is totally open and the receiving channel is totally blocked, to such a condition, in which the transmitting channel is totally blocked and the receiving channel is totally open.

By choosing the values described in the foregoing, a very favourable function of the amplifier will, however, be obtained. The transmitting channel is from the start not totally blocked, but only substantially choked. This means, that the rest amplification of said channel is located within the active part of that curve, which represents the amplification as a function of the signal voltage supplied to the input of the channel. When the signal voltage is supplied to said input, the amplification, will, therefore, be increasing smoothly, and no sudden increases of the amplification or sudden decreases of the amplification will be obtained. Because the receiving channel is adapted to generate a control voltage, which still more decreases the amplification in the transmitting channel, a complete security against compression because of acoustical feedback is, however, obtained when the receiving channel is in work, i.e. when signal voltages are passing from the conductor L over the fork circuit G and through the receiving channel to the loudspeaker H and from the latter to the microphone. Because of the related conditions, the transmitting channel is sufficiently closed.

When the amplifier is in use, and the receiving channel is passed by signal voltages, which are reproduced as sound by the loudspeaker H, the transmitting channel will be provided with signal voltages partly through electrical cross talk between the receiving channel and the transmitting channel and partly because of the fact, that sound waves are transmitted from the loudspeaker H to the microphone M. Because the amplifier stage F*p* is never totally blocked, a certain part of the signal voltage will reach the point P1 and will be amplified in the amplifier F*st*1 and give rise to the generation of the control voltage in the control voltage generator RA. Such a control voltage would now tend to increase the amplification in the amplifier stages F*p* and F*s* which would result in a compression or a switch over of the speech direction. In order to prevent this, the amplifier according to the invention is so designed, that the negative voltage which is generated and supplied to the conductor RL because of the signal voltages which are derived from the point P2 when the receiving channel is passed by signal voltages, always is at least equal to the signal voltages, which, because of said cross talk, are generated and supplied to the conductor RL. Because of this fact, there will never be any risk for an unwanted change of the speech direction because of cross talk or of any other transmission of signal voltages from the receiving channel to the transmitting channel.

The amplifier according to the invention is especially suitable for use in loudspeaking telephone instruments, which are connected to an ordinary two-conductor telephone line, and which are supplied with current from said line. But the amplifier according to the invention may also be used in other acoustical electrical systems where substantially equal conditions are present.

Different modifications of the invention may be made within the scope of the appended claims.

I claim:

1. An amplifier with two separate amplifying channels for use in combination in an electrical acoustical system wherein the input of a first one of the channels is adapted to be connected to an electrical signal generating acoustic device with a well defined signal level, for example a microphone, and wherein the input of the second of said channels is adapted to be connected in a communication system with a less well defined signal level, for example a telephone line with varying signal levels, and wherein the output of said second channel is adapted to be connected to an acoustic signal generating electrical device, for example a loudspeaker, acoustic-electrical cross talk being present between said channels, primarily between said two devices, said amplifier further comprising: a fork circuit connected between the output of said first channel and the input of said second channel; a control means adapted to generate control voltages responsive to and representative of signal voltages derived from output points in both of said two channels, said control means having an output connection to both of said channels for applying control voltages signals for influencing amplification in both of said channels; said first channel including circuitry means providing low amplification at rest condition in response to absence of input signals thereto and said second channel including circuitry means providing amplification during said rest condition which is relatively higher than rest condition amplification of said first channel but no higher than amplification when a signal is supplied from the communication system to the input of said second channel; said control means including circuitry responsive to signal voltages from said output points of both of said channels to generate secondary control voltages such that the secondary control voltage which corresponds to the signal level in said second channel exceeds that which corresponds to the signal level in said first channel when cross talk results between said two devices and including circuitry responsive to said two secondary control voltages providing a primary control voltage signal on said control means output; and controlled stages for varying signal amplitude in said two channels connected to receive said primary control voltage via said output connection and responsive to said conditions of cross talk to bring the amplification in said first channel to a still lower value than it has in said rest condition and to bring amplification in said second channel to a still higher value than it has in rest condition.

2. An amplifier as defined in claim 1, wherein said control means comprises an adding circuit with two inputs, and said circuitry which receives signal voltages from said two channels, independently rectifies and supplies each channel's signal voltage to an associated one of said adding circuit inputs, the circuitry providing one of said rectified voltages as negative and the other as positive with respect to a reference voltage, said adding circuit providing an output primary control voltage which is positive or negative dependent on whether the positive or negative rectified voltage supplied to said adding circuit inputs has the greatest amplitude; and said controlled stages in said two channels having means responsive to control voltage signals of one polarity to further open the channel which is already substantially open in rest condition and still further closing the channel which already in rest condition is substantially closed, and responsive to control voltage signals of the other polarity to close the channel which is substantially open in rest condition and open the channel which in rest condition is substantially closed.

3. An amplifier as defined in claim 2, wherein said adding circuit comprises two series connected resistors, a positive potential being supplied to the free end of one of said resistors and negative potential being supplied to the free end of the other said resistor.

4. An amplifier as defined in claim 3, said control means circuitry for producing secondary voltage signals responsive to signals from said first channel comprises two diodes, the cathode of a first one of said diodes being connected to the anode of the second one of said diodes, the interconnection point between said two diodes being supplied with alternating signal voltages from said output point in said first channel, the anode of said first diode being connected to a point having substantially constant potential and the cathode of said second diode being connected to the free end of one of said resistors in said adding circuit; and said control means circuitry for generating voltage signals responsive to signals from said second channel comprises third and fourth diodes, the anode of said third diode being connected to the cathode of said fourth diode and the interconnection point between said third and fourth diodes being supplied with alternating signal voltage from said output point in said second channel; the cathode of said third diode being connected to said point having substantially constant potential and the anode of said fourth diode being connected to the free end of said other resistor in said adding circuit.

5. An amplifier as defined in claim 3, wherein a voltage stabilizing element is connected in parallel with said adding circuit and limits the DC-voltage over the adding circuit.

6. An amplifier as defined in claim 5, wherein said voltage stabilizing element is a Zener diode.

7. An amplifier as defined in claim 3, wherein a voltage stabilizing element, which has a certain threshold value, is connected between the interconnection point of said two resistors in said adding circuit and said point which has substantial constant potential.

8. An amplifier as defined in claim 7, wherein said voltage stabilizing element is a germanium diode.

9. An amplifier as defined in claim 3, wherein three filter capacitors are connected between a point with a substantially constant potential and said adding circuit, one of said capacitors being connected to the free end of said one of said resistors, a second of said capacitors being connected to the interconnection point between said two resistors and said third of said capacitors being connected to the free end of said other of said resistors.

References Cited

UNITED STATES PATENTS

| | | | |
|---|---|---|---|
| 3,146,313 | 8/1964 | Ulin. | |
| 3,392,243 | 7/1968 | Skoog | 179—170.6 X |

OTHER REFERENCES

Cleary, R. T., and Cannon, T. G., The New Speakerphone, Executive Model, Automatic Electric Technical Journal, July 1961, vol. 7, No. 7, pp. 232–238.

KATHLEEN H. CLAFFY, Primary Examiner

V. C. WILKS, Assistant Examiner

U.S. Cl. X.R.

179—81, 170

UNITED STATES PATENT OFFICE

CERTIFICATE OF CORRECTION

Patent No. 3,461,240 August 12, 1969

Owe Lindgren

It is certified that error appears in the above identified patent and that said Letters Patent are hereby corrected as shown below:

Column 3, line 23, "aid" should read -- said --. Column 5, line 20, "stage" should read -- stages --; line 35, "indepent" should read -- independent --. Column 6, line 29, "TEP" should read -- TFP --.

Signed and sealed this 2nd day of June 1970.

(SEAL)
Attest:

Edward M. Fletcher, Jr.
Attesting Officer

WILLIAM E. SCHUYLER, JR.
Commissioner of Patents